(12) United States Patent
Böckenhauer et al.

(10) Patent No.: US 7,661,113 B2
(45) Date of Patent: Feb. 9, 2010

(54) METHOD AND SYSTEM FOR DATA PREPARATION AND COMMUNICATION BETWEEN SOFTWARE APPLICATIONS

(75) Inventors: Jens Böckenhauer, Wiesloch (DE); Holger Bohle, Dielheim (DE)

(73) Assignee: SAP AG, Walldorf (DE)

( * ) Notice: Subject to any disclaimer, the term of this patent is extended or adjusted under 35 U.S.C. 154(b) by 605 days.

(21) Appl. No.: 11/606,441

(22) Filed: Nov. 29, 2006

(65) Prior Publication Data
US 2008/0082964 A1     Apr. 3, 2008

Related U.S. Application Data

(60) Provisional application No. 60/848,532, filed on Sep. 28, 2006.

(51) Int. Cl.
- G06F 3/00 (2006.01)
- G06F 9/44 (2006.01)
- G06F 9/46 (2006.01)
- G06F 13/00 (2006.01)

(52) U.S. Cl. .......... 719/319; 719/320; 709/245; 707/10

(58) Field of Classification Search ............ 719/319, 719/320; 707/10; 709/245
See application file for complete search history.

(56) References Cited

U.S. PATENT DOCUMENTS

| | | | |
|---|---|---|---|
| 6,640,238 B1 * | 10/2003 | Bowman-Amuah | 709/201 |
| 7,020,880 B2 * | 3/2006 | Mellen-Garnett et al. | 719/310 |
| 7,222,148 B2 * | 5/2007 | Potter et al. | 709/201 |
| 7,412,709 B2 * | 8/2008 | Branson et al. | 719/328 |
| 2006/0206567 A1 * | 9/2006 | Milligan et al. | 709/206 |
| 2009/0164571 A1 * | 6/2009 | Potter et al. | 709/203 |

OTHER PUBLICATIONS

Crawford, Pointers, References and Values, Michael D. Crawford, 2005, section "How to Pass Parameters to Functions", pp. 1-14.*

* cited by examiner

Primary Examiner—Diem K Cao
(74) Attorney, Agent, or Firm—Kenyon & Kenyon LLP

(57) ABSTRACT

One embodiment of a method comprises adding an action script to an ordered stack of action scripts maintained by an execution controller, wherein the added action script corresponds to a navigation input received at a first application, the added action script is unpopulated by a data input, and the added action script is added last in an order of the ordered stack. The embodiment also comprises providing the ordered stack of action scripts to a second application by the execution controller, and executing at the second application the ordered stack of action scripts according to the order, the ordered stack having the unpopulated first action script. The embodiment also comprises populating the added first action script with the data input, wherein the data input is received at the first application and the populating occurs after the executing.

29 Claims, 9 Drawing Sheets

METHOD AND SYSTEM FOR DATA PREPARATION AND COMMUNICATION BETWEEN SOFTWARE APPLICATIONS

CROSS-REFERENCE TO RELATED APPLICATIONS

This application claims the benefit of and priority to U.S. Provisional Patent Application No. 60/848,532, to Jens Böckenhauer and Holger Bohle, filed on Sep. 28, 2006, entitled "Data Preparation For Stateless Backend Calls from Stateful Frontend Applications," which is herein incorporated by reference in its entirety.

BACKGROUND INFORMATION

Services provided by a computing system may include any type of functionality provided by the system and may be implemented at least in part by software applications of the system. For example, a particular service may include a business functionality and be implemented by an application which includes business logic to perform the business functionality. Generally speaking, legacy applications exist which have become outdated in some aspect, but which may implement services which are still useful. For example, the user interface of a legacy application may have become outdated, but the service it implements may still be useful. One approach to using the services of legacy applications includes developing a new application which reuses the services of the legacy application but which updates the outdated aspects.

One problem associated with this approach is that there may be difficulties in communicating between the new application and the legacy application. For example, the new application and the legacy application may be executed by the computing system according to different contexts such as, for example, a specific relative time and duration of execution. Thus, data which is dependent on a context or state of the new or legacy application may be incorrectly communicated between the new and legacy applications.

BRIEF DESCRIPTION OF THE DRAWINGS

So that features of the present invention can be understood in detail, a description of the invention can be had by reference to embodiments, some of which are illustrated in the appended drawings. It is to be noted, however, that the appended drawings illustrate only particular embodiments of the invention and are therefore not to be considered limiting of its scope, for the invention may admit to other equally effective embodiments.

DETAILED DESCRIPTION

Figure 1:
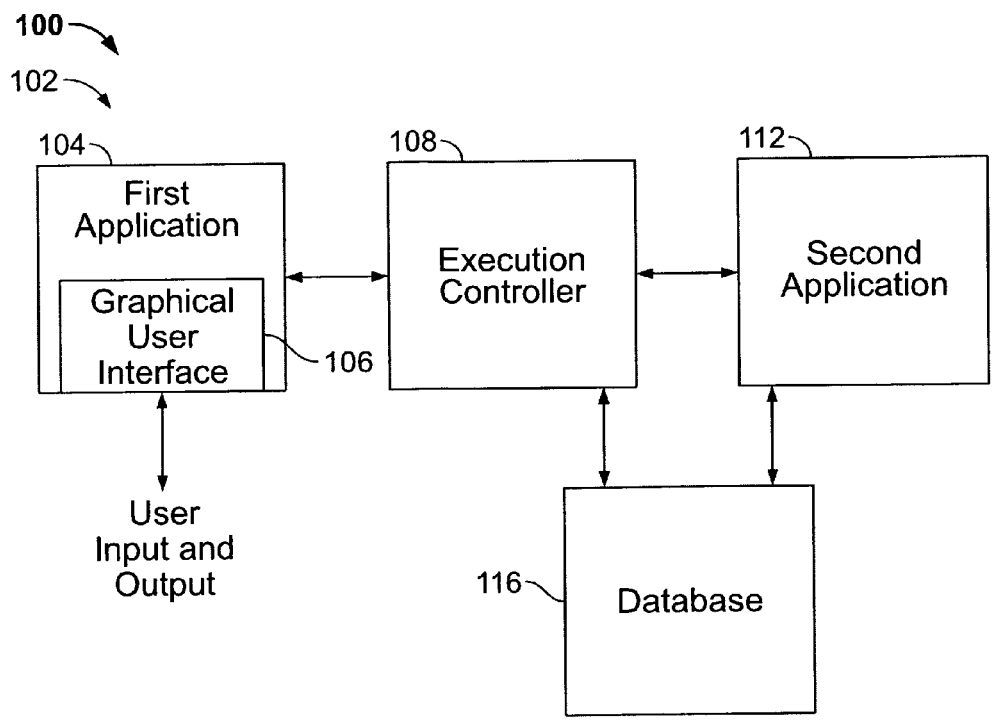
FIG. 1 is a schematic diagram depicting one embodiment of a software architecture.

Embodiments are related to data preparation and communication between software applications. FIG. 1 depicts one embodiment of a software architecture 100. The depicted exemplary embodiment of the software architecture 100 comprises a plurality of software components 102, including a first application 104, an execution controller 108, and a second application 112. The first application 104 is capable of receiving input from a user, and communicating with the execution controller 108. The execution controller 108 is capable of communicating with both the first application 104 and the second application 112. The second application 104 is capable of performing a service. In one embodiment, the software architecture 100 includes a database 116, and the performing of the service by the second application 112 includes accessing the database 116. In one embodiment, the execution controller 108 is capable of accessing the database 116. Other embodiments of the software architecture 100 also exist.

In an exemplary scenario, the first application 104 is a relatively newer application and the second application 112 is a relatively older application, e.g., a legacy application. For example, the first application 104 can be developed to update some undesirable or outmoded aspect of the second application 112. In one embodiment, the first application 104 comprises a graphical user interface 106 that is updated user interface relative to a user interface (not shown) of the second application 112. In one embodiment, the software architecture 100 depicted in FIG. 1 corresponds to the software architecture described in U.S. patent application Ser. No. 11/441,463, to Stefan Elfner et al., filed Apr. 25, 2006, entitled "Mapping a New User Interface onto an Existing User Interface," which is hereby incorporated by reference in its entirety.

Figure 2:
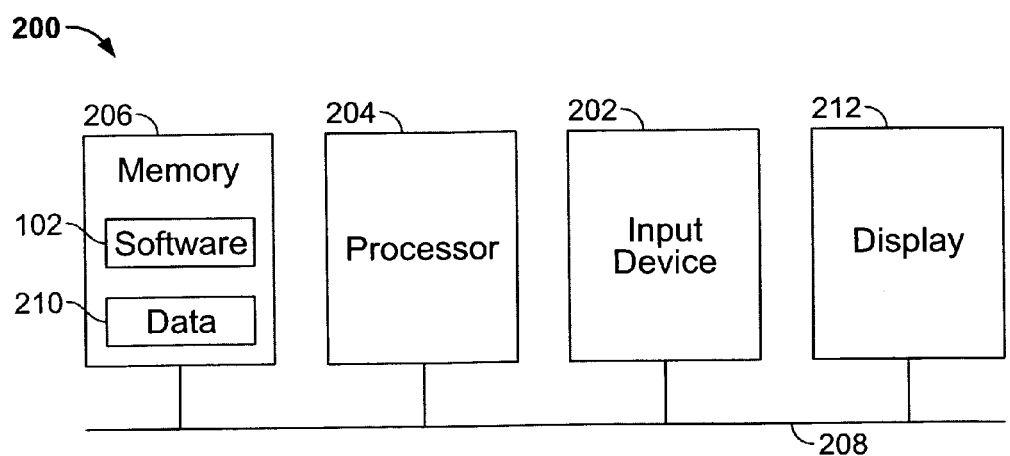
FIG. 2 is a schematic diagram depicting one embodiment of a computing environment.

The software architecture 100 runs in, and is part of, a computing environment 200, an exemplary embodiment of which is depicted in FIG. 2. The computing environment 200 comprises an input device 202, a processor 204, a memory 206, a communication line 208 and a display 212. The memory 206 further comprises data 210 and the various software components 102, which are stored in the memory 206 at least at some moment in time. The input device 202 optionally comprises at least one of: a keyboard, a mouse, a voice activated controller, an optical controller, an infrared controller, or other suitable input device. The memory 206 optionally comprises at least one of: a random access memory, a disk storage memory, or other suitable memory. The display 212 optionally comprises at least one of: a monitor, a television, a video projector, or other suitable display device. The software components 102 comprise computer program instructions which may be accessed and executed by the processor 204. The software components 102 are implemented in any suitable software language such as, for example, Java, ABAP, C, C++, etc. The data 210 optionally comprises data which is accessible by or integral to the database 116.

The memory 206, processor 204 and input device 202 are connected together and communicate with each other by means of the communication line 208. In one embodiment, the communication line 208 comprises a system bus, and the computing environment 200 comprises a single computer. In another embodiment, the communication line 208 comprises a network element, and the computing environment 200 comprises a distributed computing environment. In one embodiment in which the computing environment 200 is distributed, the memory 206, processor 204 and input device 202 are optionally distributed across different locations. In one embodiment in which the computing environment 200 is distributed, the computing environment 200 optionally comprises a plurality of some or all of the memory 206, the processor 204 and the input device 202. Other configurations of the computing environment 200 are also possible.

The software components comprise computer program instructions, which when executed by the processor 304, enable the performance of a method 300 (shown in FIG. 3) of using the software architecture 100 and a method 600 (shown in FIG. 6) of preparing data for communication between the first and second applications 104, 112 and communicating between the first and second applications 104, 112. In one embodiment, a computer-readable medium comprises the computer program instructions which enable the performance of the methods 300, 600. In one embodiment, a system comprises means to perform each of the steps of the methods 300, 600. For example, in one embodiment, the means to perform each of the steps of the methods 300, 600 comprise elements of the computing environment 200.

Figure 3:
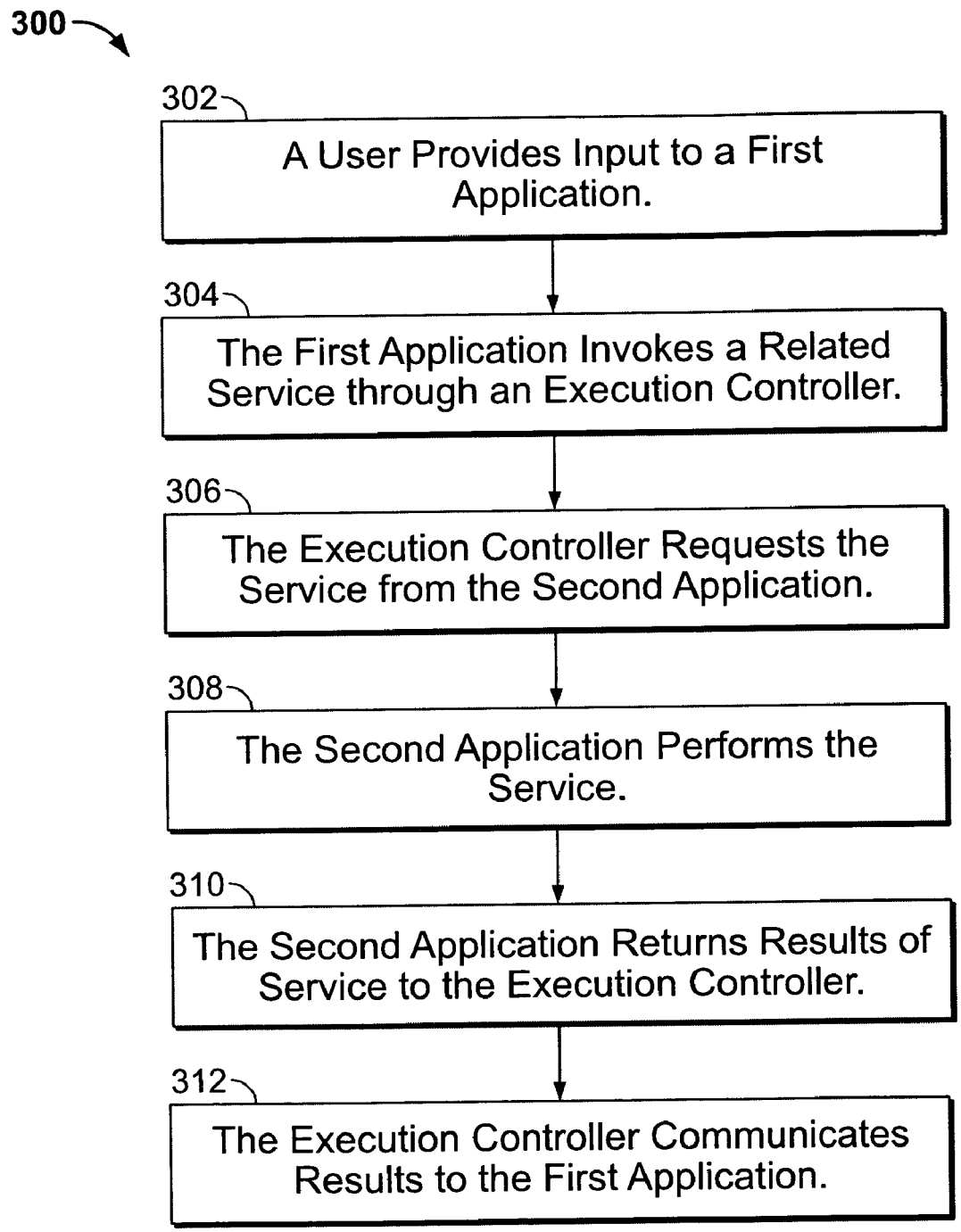
FIG. 3 is a flow chart depicting a schematic representation of one embodiment of a method.

FIG. 3 is a flow chart depicting a schematic representation of one embodiment of the method 300 of using the software architecture 100. According to the illustrated embodiment, at step 302 the user provides an input to the first application 104. The input to the first application 104 typically comprises an input to the graphical user interface 106 of the first application 104. At step 304 the first application 104 then invokes a service through the execution controller 108, the service being related to the received user input. At step 306 the execution controller 108 then requests the invoked service from the second application 112. At step 308 the second application 112 then performs the requested service. At step 310 the second application 112 returns a result of the service, optionally including any output data, to the execution controller 108. At step 312 the execution controller 108 then communicates with the first application 104 regarding the result, optionally including communicating the output data.

The performance of the method 300 typically results in a change of state 402 (shown in FIG. 4) of the first application 104. The state 402 of the software component 102, e.g. the first or second applications 104, 112, is the operational status of the component 102 at a particular moment in time. The state 402 of the component 102 includes the status of both the user interface and other elements of the component 102 not directly presented to the user. In one embodiment in which the first application 104 comprises the graphical user interface 106, a particular state 402 of the first application 104 comprises the particular visual configuration of the graphical user interface 106 presented to the user. For example, the graphical user interface 106 comprises elements which are visible to the user, and a state 402 of the first application 104 thus comprises a specific configuration of the visible elements of the graphical user interface 106.

Figure 4:
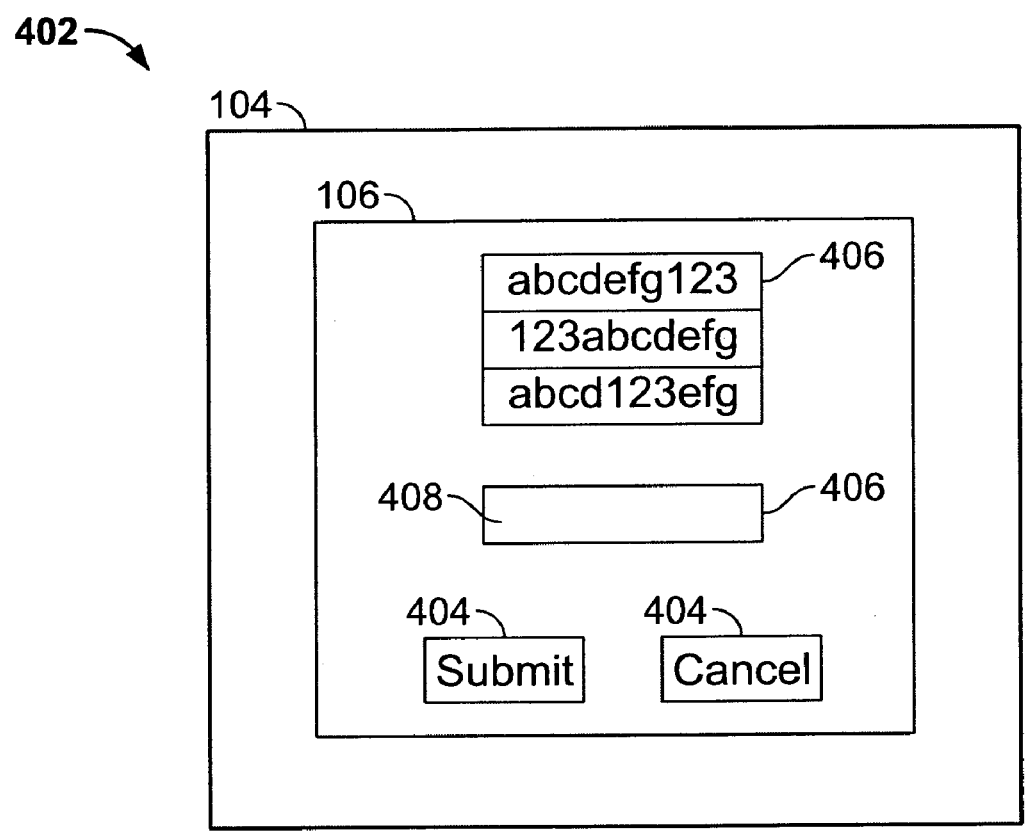
FIG. 4 is a schematic diagram depicting one embodiment of a graphical user interface of a first application.

In one embodiment, the graphical user interface 106 of the first application 104 comprises graphical elements including at least one of: at least one button 404 (shown in FIG. 4), or at least one data display 406 (shown in FIG. 4). In such an embodiment, the state 402 of the first application 104 comprises a specific visual configuration of any buttons and data displays of the graphical user interface 106. FIG. 4 depicts one embodiment of the first application 104 having the graphical user interface 106 having the at least one button 404 and the at least one data display 406.

The at least one button 404, as referred to herein, refers to any element of the graphical user interface 106 which can accept an input from the user to trigger an action. The at least one button 404 may graphically resemble an actual button, but may also appear as other types of controls or visual elements, such as, e.g., switches, selectors, radio buttons, pull-down boxes, menus, menu items, etc. The action, as referred to herein, and also as referred to as a navigation action or a navigation, triggered by the at least one button 404 navigates the first application 104 between states 402. For example, a specific action, i.e., a specific navigation, triggered by a specific button 404 may navigate the first application 104 between a first state 402a of the first application 104 and a second state 402b of the first application 104. The first and second states 402a,b can be different states 402 or the same states 402. Different states 402 may appear visually different to the user, or may appear visually the same or similar to the user. Two states 402 which are the same appear visually the same to the user. A navigation between the first and second states 402a,b which are the same states 402 is also referred to as a trivial navigation.

The at least one data display 406, as referred to herein, refers to any element which displays data to the user as part of a service being performed. In one embodiment, the data displayed to the user by the at least one data display 406 comprises data retrieved from the database 116. For example, in one embodiment, the data display 406 comprises a database table. The at least one data display 406 can also optionally accept input from the user. For example, in one embodiment, the at least one data display 406 comprises a data input field 408 which is capable of accepting data input from a user. The data input optionally comprises at least one of: numerical data, textual data, or a data file. Input to the at least one data display 406 can provide new data to the first application 104 and change existing data being displayed by the first application 104.

Figure 5:
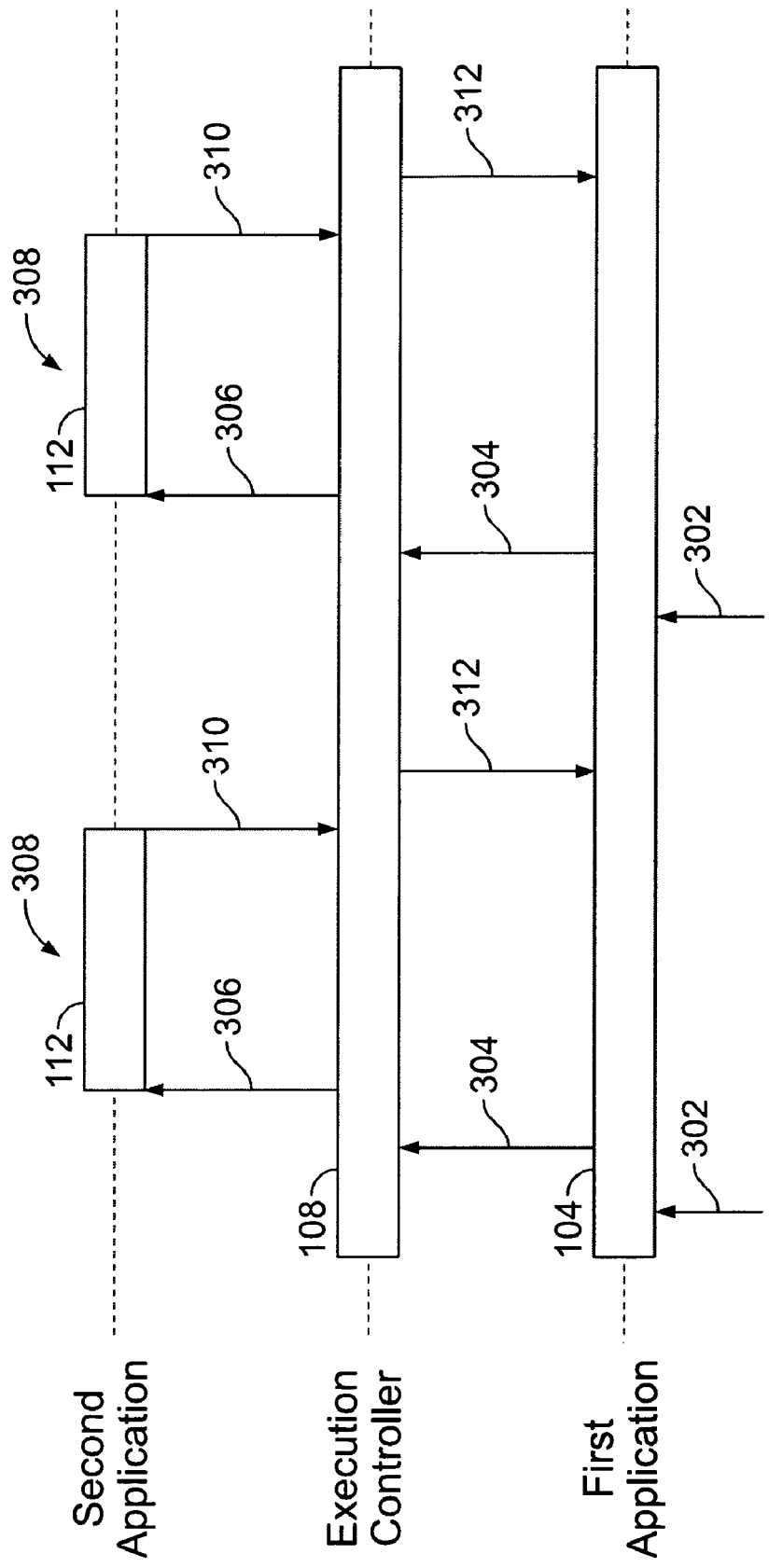
FIG. 5 is a schematic diagram depicting another representation of one embodiment of the method depicted in FIG. 3.

FIG. 5 is flow diagram depicting another schematic representation of one embodiment of the method 300. The depiction of FIG. 5 illustrates the method 300 by graphically relating each step of the method 300 according to which software component 102 the step involves. FIG. 5 also shows additional aspects of the method 300 by which, in one embodiment, the first application 104 is executed in a stateful manner and the second application is executed in a stateless manner. For example, in one embodiment, the fist application 104 individually invokes 304, through the execution controller 108, a plurality of services from the second application 112 over a period of time. As depicted in FIG. 5, the first application 104 executes in a stateful manner because it is kept running throughout the process of invoking 304 the plurality of services, and as such has a corresponding state 402 at each moment in time. By contrast, the second application 112 executes in a stateless manner wherein the second application 112 is launched at the beginning of each service request 306, performs 308 the service, and then is terminated upon completing each requested service. The second application 112 is not kept running between successive service requests 306, it is instead terminated upon completion of each request 306 and before responding to another request 306. Thus, the second application 112 is executed in a stateless manner because the second application 112 is not kept running, and therefore has no state, between the end of the performance 308 of one service and a subsequent service request 306.

Figure 6:
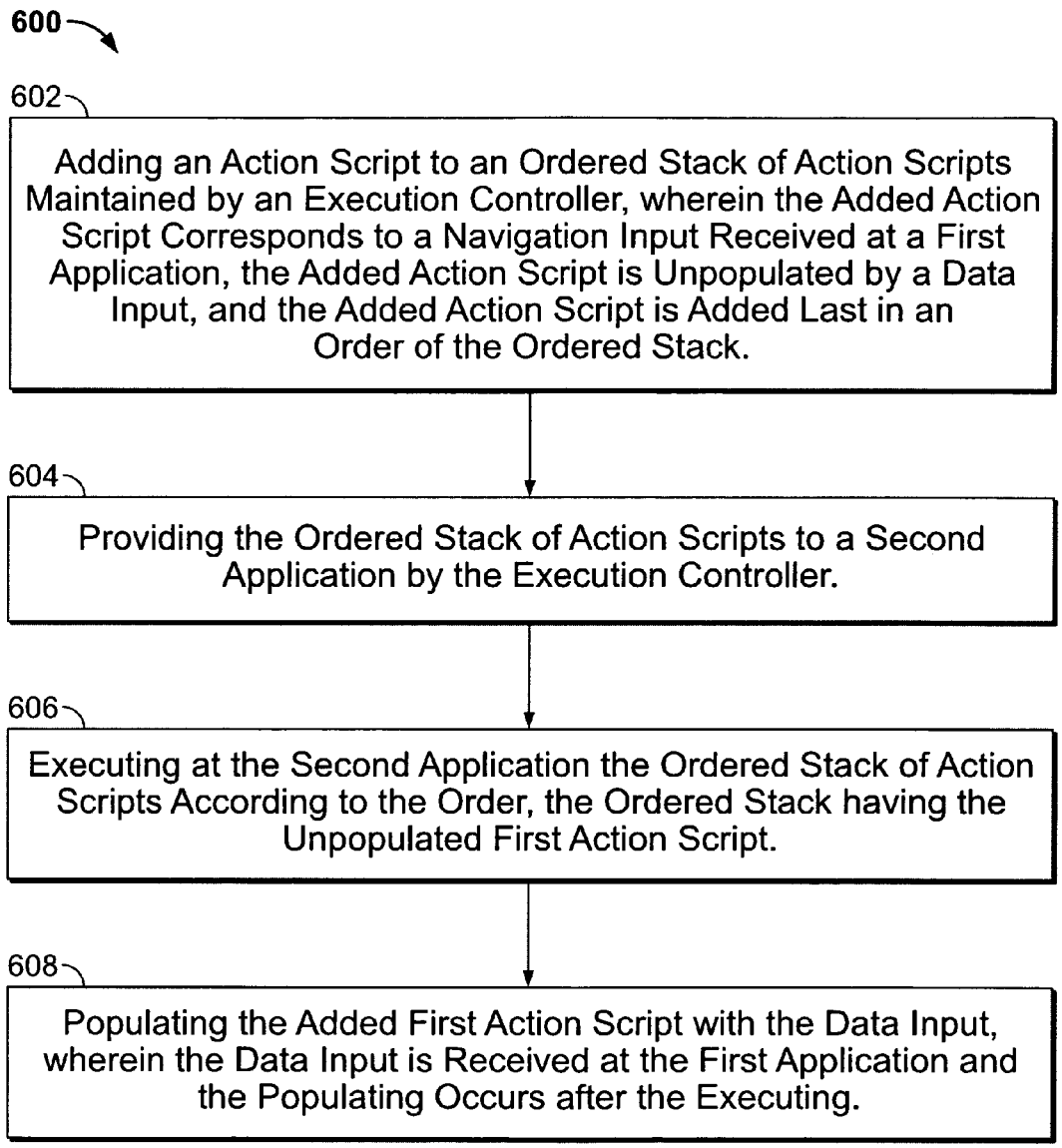
FIG. 6 is a flow chart depicting a schematic representation of one embodiment of another method.
Figure 7:
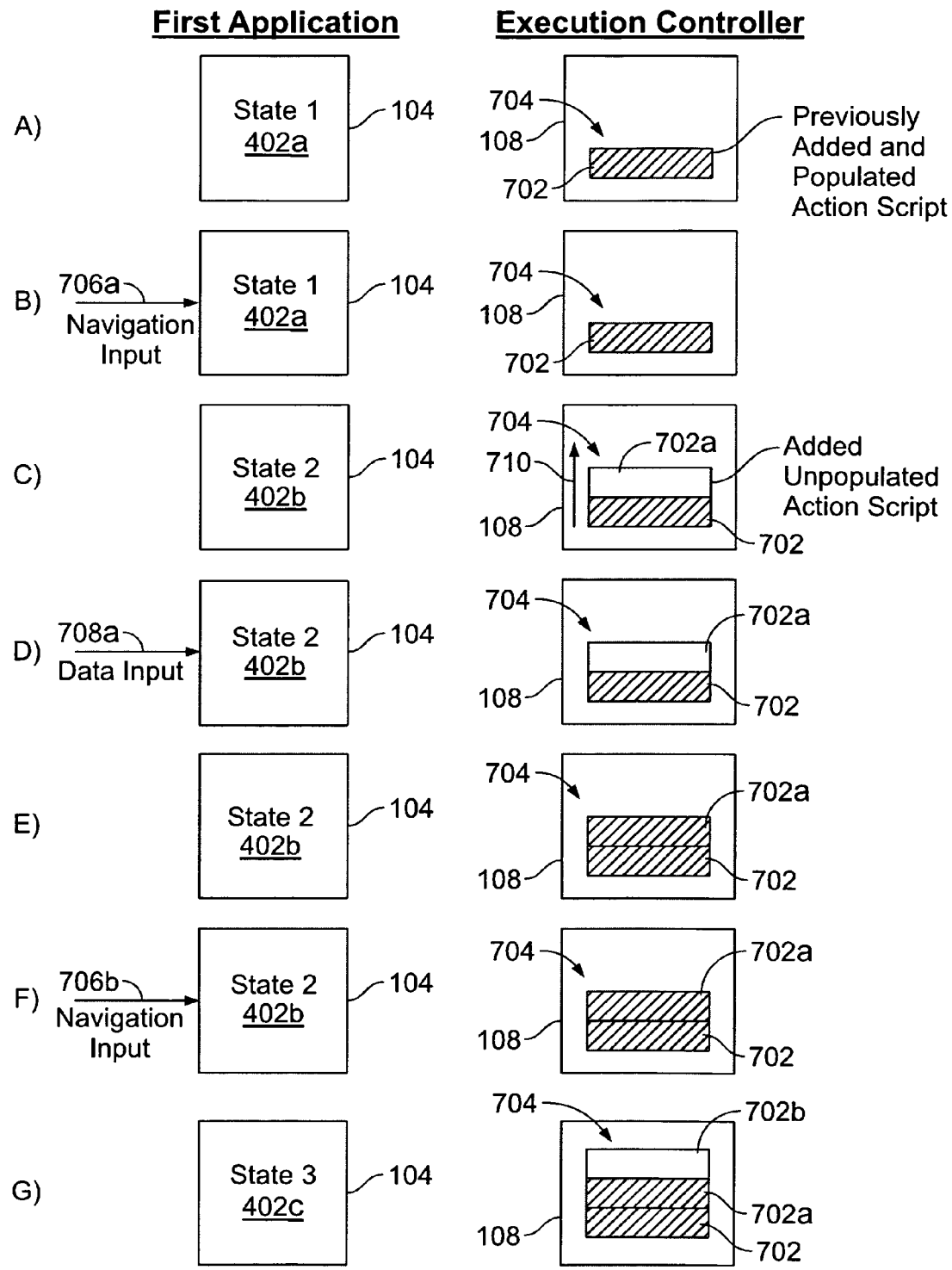
FIGS. 7A-G are schematic diagrams depicting another representation of one embodiment of the method depicted in FIG. 6.

In one embodiment, a method 600 of preparing data for communication between the first and second applications 104, 112, and of communicating between the first and second applications 104, 112, is provided. FIG. 6 is a flow chart depicting a schematic representation of one embodiment of the method 600. FIGS. 7A-G are schematic diagrams which also depict some aspects of an exemplary performance of one embodiment of the method 600 in further detail. In one embodiment, the method 600 prepares data, and communicates, to enable the first application 104 to execute in a stateful manner and the second application 112 to execute in a stateless manner.

In the depicted embodiment, the method 600 begins at step 602. At step 602, a first action script 702a is added to an ordered stack 704 of action scripts 702 which is maintained by the execution controller 108. Each action script 702 of the ordered stack 704 of action scripts 702 comprises at least one command for execution at the second application 112. The at least one command of each action script 702 corresponds to a navigation input 706 received at the first application 104. Inputs received at the first application 104 include navigation inputs 706 and data inputs 708. As discussed above, navigation inputs 706 change the state 402 of the first application 104 and are received by the at least one button 404; and data inputs 708 provide data to the first application 104 or change data being displayed by the first application 104, and are received by the at least one data display 406. The at least one command of the action script 702 performs an action at the second application 112 that is a translation of the action at the first application 104 which is triggered by the navigation input 706. In this way, the inputs to the first application 104 are mapped to commands at the second application 112 in the form of action scripts 704 maintained by the execution controller 108.

At step 602, the first action script 702a added to the ordered stack 704 of action scripts 702 corresponds to a first navigation input 706a received at the first application 104. Action scripts 702 can also correspond to an data input 708 received at the first application 104. Data inputs 708 corresponding to an action script 702 provide data to populate parameters of the commands of the action script 702. However, at step 602 the added first action script 702a is added to the ordered stack 704 of action scripts 702 as yet unpopulated by any data related to a corresponding data input 708.

The ordered stack 704 of action scripts 702 represents the service the execution controller 108 requests 306 from the second application 112. The execution controller 108 stores the ordered stack 704 of action scripts 702 in the memory 206, which for this purpose may optionally comprise a relatively fast memory such as a cache.

At step 602, the first action script 702a which is added to the ordered stack 704 of action scripts 702 is added last in an order 710 of the ordered stack 704 of action scripts 702. The ordered stack 704 of action scripts 702 is arranged according to the order 710 of the ordered stack 704 of action scripts 702, from an action script 702 which is first in the order 710, i.e. which has been added first, to an action script 702 which is last in the order 710, i.e. which has been added last. The order 710 of the action scripts 702 is the order in which the action scripts are executed at the second application 112. The service requested 306 from the second application 112, which is represented by the ordered stack 704, thus comprises the commands, and any accompanying data, of each of the action scripts 702 in the ordered stack 704 of action scripts 702, executed according to the order 710.

In one embodiment, the ordered stack 704 of action scripts 702 comprises a plurality of action scripts 702. In one embodiment, a specific single action script 702 of the ordered stack 704 of action scripts 702 comprises a plurality of commands for execution at the second application 112.

In the embodiment depicted in FIG. 6, the method 600 proceeds to step 604 after step 602. At step 604, the execution controller 108 provides the ordered stack 704 of action scripts 706 to the second application 112 for execution by the second application 112. The providing of the ordered stack 704 of action scripts 702 to the second application 112 by the execution controller 108 of step 604 of method 600 corresponds, generally speaking, to the execution controller 108 requesting the service from the second application of step 306 of method 300. In one embodiment, the requesting the service from the second application 112 by the execution controller 108 of step 306 of method 300 comprises the providing of the ordered stack 704 of action scripts 702 by the execution controller 108 of step 604 of the method 600.

In the embodiment depicted in FIG. 6, the method 600 proceeds to step 606 after step 604. At step 606, the ordered stack 704 of action scripts 702, having the unpopulated added first action script 702a, is executed at the second application 112 according to the order 710 of the ordered stack 704 of action scripts 702. The executing of the ordered stack 704 of action scripts 702 at the second application 112 of step 606 of the method 600 corresponds, generally speaking, to the second application 112 performing the service of step 308 of the method 300. In one embodiment, the second application 112 performing the service of step 308 of the method 300 comprises the executing of the ordered stack 704 of action scripts 702 at the second application 112 of step 606 of the method 600.

In the embodiment depicted in FIG. 5, the method 600 proceeds to step 608 after step 606. At step 608, the added first action script 702a is populated with data related to a first data input 708a received at the first application 104. In one embodiment, the added first action script 702a is populated with data comprising data of the first data input 708a received at the first application 104. The populating of step 608 occurs after the executing of step 606, and the first data input 708a is a data input to the second state 402b of the first application 104. That is, the first navigation input 706a navigates the first application 104 from the first state 402a to the second state 402b, at which point the user enters the first data input 708a. However, according to the method 600, the ordered stack 704 of action scripts 702 is executed by the second application 112 before the added first action script 702a, corresponding to the first navigation input 706a, is populated with data related to the first data input 708a at the second state 402b. It is only at step 608 that the added first action script 702a is populated with data related to the first data input 708a.

In one embodiment, the populating of step 608 comprises inserting a value from the data input field 408 of the first application 104 into a command of a corresponding action script 702. In one embodiment, the value of the data input field 408 comprises at least one of: a numerical value, or a textual value. In one embodiment, the populating of step 608 comprises inserting a data file provided by the user to the data input field 408 into a command of a corresponding action script 702. The data file optionally comprises at least one of: a cad file, a word processing file, an bitmap image file, a vector image file, or other suitable data file formats.

FIGS. 7A-G are schematic diagrams which depict some aspects of an exemplary performance of one embodiment of the method 600 in further detail. FIGS. 7A-G depict the first application 104 and the execution controller 108 at certain successive moments in time during the performance of the method 600. FIG. 7A depicts the first application 104 and the execution controller 108 at a moment in time before the user provides the first navigation input 706a to the first application 104. In FIG. 7A, the first application 104 is in the first state 402a, and the execution controller 108 has maintained the ordered stack 704 of action scripts 702 that comprise any previously added and populated action scripts 702. In FIG. 7A, the ordered stack 704 of action scripts 702 is shown containing a single, populated action script 702, however, depending on the use of the first application 104 previously to FIG. 7A, many different configurations of the ordered stack 704 of action scripts 702 are possible. For example, the ordered stack 704 may comprise a plurality of action scripts 702, some which have been populated by corresponding data inputs 708 and some that have never been populated with corresponding data inputs 708. For example, not all action scripts 702 correspond to data inputs 708. If there are no data inputs 708 corresponding to a particular action script 702, for example if the user navigated to a particular state 402 of the first application 104, but did not then provide a data input 708 to that particular state 402, and instead, for example, navigated to a different state 402, then the populating of step 608 does not need to occur for that particular action script 702.

FIG. 7B depicts at a moment in time in which the user provides the first navigation input 706a to the first state 402a of the first application 104. FIG. 7C depicts a moment in time, subsequent to the moment depicted in FIG. 7B, in which the first unpopulated action script 702a has been added to the ordered stack 704, the executing of the ordered stack 704 of step 606 has occurred, and the first navigation input 706a has navigated the first application 104 to the second state 402b from the first state 402a. In the embodiment depicted in FIGS. 7A-G, the executing of step 606 can occur at a moment of time subsequent to FIG. 7B and before FIG. 7C. FIG. 7D depicts a moment in time, subsequent to the moment depicted in FIG. 7C, in which the user provides the first data input 708a to the second state 402b of the first application 104. FIG. 7E depicts a moment in time, subsequent to the moment depicted in FIG. 7D, in which the first action script 702a added to the ordered stack 704 has been populated by data related to the first data input 708a.

The moment in time depicted in FIG. 7E is similar in nature to the moment in time depicted in FIG. 7A. That is, the process of the embodiment of the method 600 started in FIG. 7A essentially begins again at FIG. 7E. At the moment in time depicted in FIG. 7E, the first application 104 is in the second state 402b, and the execution controller 108 is maintaining the ordered stack 704 having all the action scripts 702 that have been previously added to the ordered stack 704. In a similar way to FIG. 7B, FIG. 7F depicts a moments in time in which a second navigation input 706b is provided to the first application 104 by the user; and in a similar way to FIG. 7C, FIG. 7G depicts a moment in time, subsequent to the moment depicted in FIG. 7F, in which a second unpopulated action script 702b has been added to the ordered stack 704 of action scripts 702, and the first application 104 has navigated to a third state 402c of the first application 104. Furthermore, in the depicted embodiment, at some moment in time between the moments depicted in FIGS. 7F and 7G, the ordered stack 704 of action scripts 702 having the added unpopulated second action script 702b and the populated first action script 702a is executed at the second application 112.

One benefit provided by the populating of step 608 occurring after the executing of step 606 is to correctly align the stateful execution of the first application 104 to the stateless execution of the second application 112. For example, with each action script 702 added to the ordered stack 704 of action scripts 702, the previously added action script 702 needs to be populated with data to ensure that the state 402 of the second application 112 encountered by the newly added action script 702 corresponds correctly to the state 402 of the first application 104 at the time of the newly received corresponding navigation input 706, i.e. having accounted for the previously received data input 708. In this way, the method 600 enables consistency between the stateful execution of the first application 104 and the stateless execution of the second application 112.

In one embodiment, with each successive navigation input 708 received at the first application 104, the number of action scripts 702 in the ordered stack 704 of action scripts 702 increases.

Each state 402 of the first application 104 can correspond to an individual state 402 of the second application 112 or a plurality of states 402 of the second application 112, giving a developer maximum flexibility in designing and developing the first application 112. For example, in a scenario in which the first application 104 is developed to update a user interface of the second application 112 but retain, at least in part, the business logic and associated business functionality of the second application 112, the graphical user interface 106 of the first application 104 can be designed to correspond to functionality and data from various states 402 of the second application 112. In this way, the graphical user interface 106 of the first application 104 is not limited by, and does not necessarily need to conform to a particular sequence or configuration of states 402 of the user interface of the second application 112.

Figure 9:
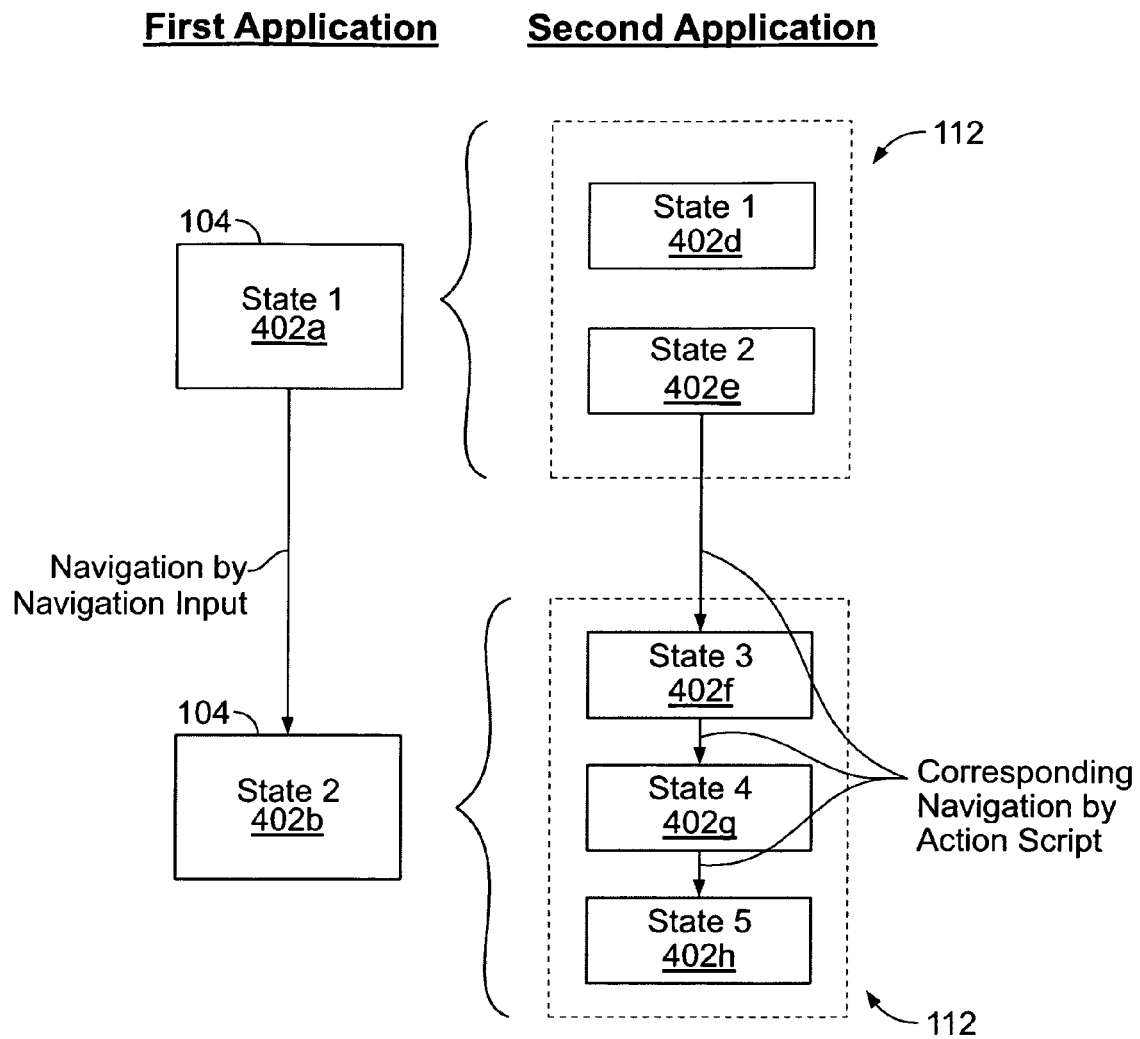
FIG. 9 is a schematic diagram depicting one embodiment of a correspondence between states of the first application and states of a second application.

In one embodiment, the first state 402a of the first application 104 comprises elements corresponding to at least one first state 402 of the second application 112, and the second state 402b of the first application 104 comprises elements corresponding to a plurality of second states 402 of the second application 112. FIG. 9 depicts one example of such an embodiment. In exemplary embodiment depicted in FIG. 9, the first state 402a of the first application 104 comprises elements that correspond to two different states 402d,e of the second application 112, and the second state 402b of the first application 104 comprises elements that correspond to three different states 402f,g,h of the second application 112. Although the exemplary embodiment depicted in FIG. 9 illustrates both the first and second states 402a,b of the first application 104 as each comprising elements from a plurality of states 402 of the second application 112, either the first or second state 402a,b of the first application 104 may instead comprise elements from only one state 402 of the second application 112.

In embodiments in which the first state 402a of the first application 104 comprise elements corresponding to at least one first state 402 of the second application 112, and the second state 402b of the first application 104 comprises elements corresponds to a plurality of second states of 402 the second application 112, the executing of the first action script 702a at the second application 112 by the execution controller 108 navigates from the at least one first state 402 of the second application 112 through all of the plurality of second states 402 of the second application 112, as depicted in FIG. 9. In this way, the executing of the first action script 702a visits each of the plurality of second states 402 of the second application 112 to gather information needed to show all of the elements of the second state 402b of the first application 104.

The second application 112 may require an input, e.g. data, responsive to a state 402 of the second application 112 visited during the execution of the action script 702. In one embodiment, only one of the plurality of second states 402 of the second application 112 requires a responsive input, and this second state 402 requiring input is navigated to last in an order of a navigation sequence of the plurality of second states 402 of the second application 112 during the executing of the first action script 702a. Navigating to the second state 402 requiring input last in the navigation sequence can prevent the action script 702 from encountering an error which would prevent the successful execution of the entire ordered stack 704 of action scripts 702.

In one embodiment, the ordered stack 704 of action scripts 702 comprises a plurality of action scripts 702, and the executing of the ordered stack 704 of action scripts 702 of step 606 comprises executing all of the plurality of action scripts 702 in the ordered stack 704, and the executing comprises: launching the second application 112 only at the beginning of the executing of the ordered stack 704 of action scripts 702, and terminating the second application 112 upon completion of the executing of the ordered stack 704 of action scripts 702.

In one embodiment the first application 104 comprises the graphical user interface 106 wherein the graphical user interface 106 is accessed in real-time by a human user, and the second application 112 comprises a batch input functionality that processes batches of commands without requiring real-time access by a human user for each command. For example, in one such embodiment, the graphical user interface 106 of the first application 104 is displayed on the display 212 to the user, who then provides input using the input device 202. The second application 112 runs in a process which is not visible to the user, and is not displayed on the display, for example, in one embodiment, by using the batch input capability. The first application 104 and the execution controller 108, in one embodiment, are typically located in a portion of the memory 206, and executed by a first processor 204, which are at least partially local to the user. The second application 112, in one embodiment, is typically located in a portion of the memory 206, and executed by a second processor 204, which is at least partially remote from the user.

Figure 8:
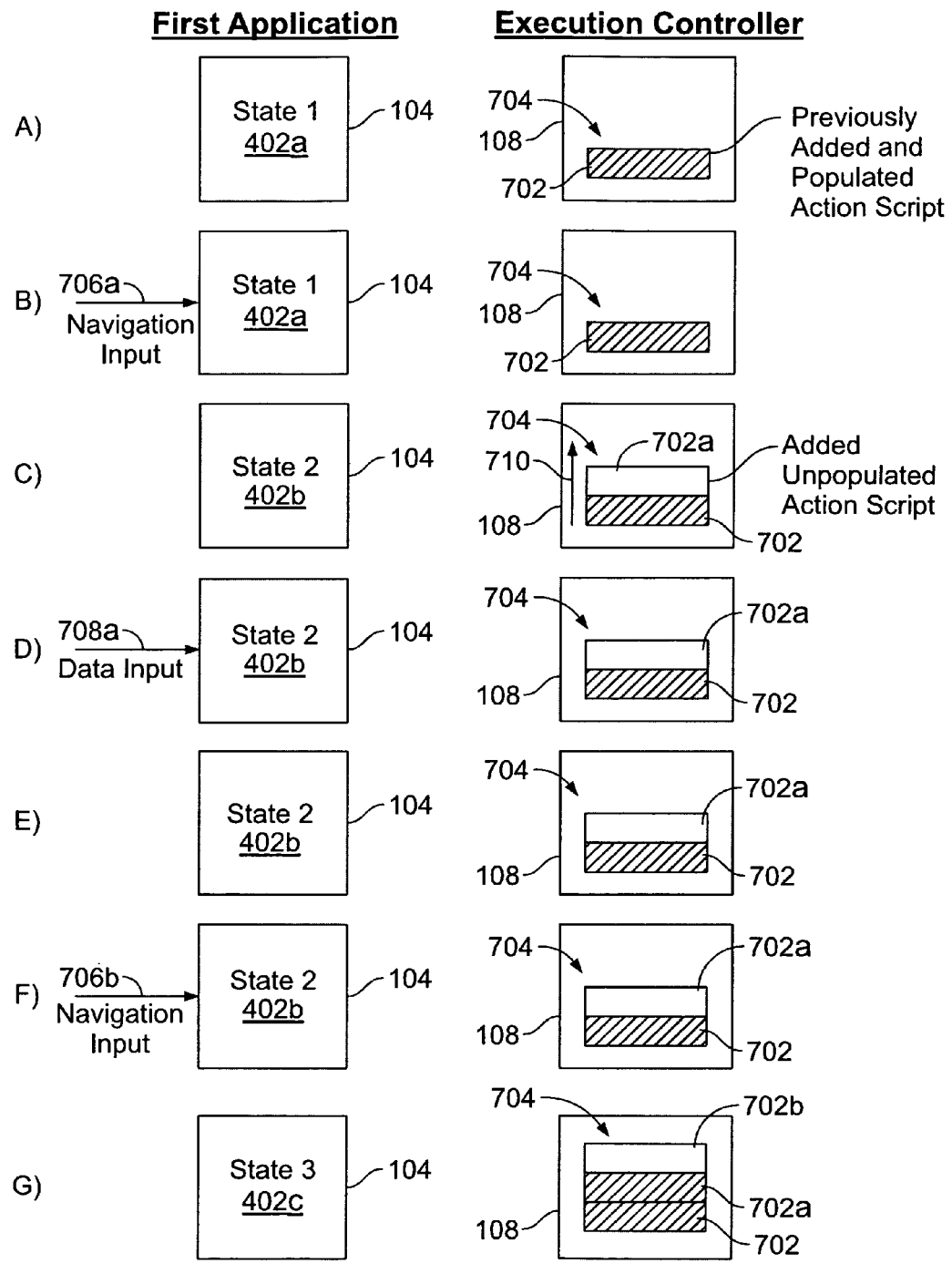
FIGS. 8A-G are schematic diagrams depicting yet another representation of one embodiment of the method depicted in FIG. 6.

The populating of step 608 can be triggered in different ways to provide different operating characteristics of the method 600. In one embodiment, the populating of the added first action script 702a is triggered in response to at least one of: receiving the first data input 708a at the first application 104, or receiving the second navigation input 706b at the first application 104. For example, in the embodiment depicted in FIG. 7, the populating of the added first action script 702a is triggered in response to the receiving of the first data input 708a at the first application 104. In other embodiments, however, the populating of the added first action script 702a is triggered in response to the receiving the second navigation input 706b at the first application 104. FIG. 8 depicts one embodiment in which the populating of the added first action script 702a is triggered in response to the receiving of the second navigation input 706b at the first application 104. The embodiment depicted in FIG. 8 is identical to that depicted in FIG. 7, except that the populating of the added first action script 702a is triggered in response to the receiving of the second navigation input 706b, and thus the embodiment depicted in FIG. 8 differs from that depicted in FIG. 7 in that the added first action script 702a remains unpopulated in FIGS. 8E-F, whereas the added first action script 702a is populated in FIGS. 7E-F. FIG. 8G shows the added first action script being populated after the receiving of the second navigation input 706b. In the embodiment depicted in FIG. 8, the added first action script 702a is populated and the second action script 702b is added to the ordered stack 704 after the receiving of the second navigation input 706b and before a subsequent executing of the ordered stack 704, the subsequent executing occurring, in the depicted embodiment, between the moments in time depicted by FIGS. 8F-G.

In one embodiment, the steps of the method 600 are repeated in a cyclic fashion. That is, in one embodiment, the method 600 comprises sequentially adding a plurality of action scripts 702 to the ordered stack 704 of action scripts 702, each of the plurality of action scripts 702 corresponding to one of a plurality of navigation inputs 706 received at the first application 104, and each time a new action script 702 is added, the method 600 comprises: leaving the newly-added action script 702 unpopulated by data input 708, populating a most-previously added action script 702 with corresponding one of a plurality of data inputs 708 received at the first application 104, and executing the entire ordered stack 704 of action scripts 702 at the second application 112.

In some cases, the second application 112 may be unable to completely execute the entire ordered stack 704 of action scripts 702. For example, the second application 112 may generate an error message or an information message during the executing of the commands of the ordered stack 704 of action scripts 702 which may stop the executing if the message requires a responsive input. The generated message optionally comprises at least one of: an error message, or an information message. In a scenario in which these messages are unanticipated by the action script 702, there may not be necessary commands within the action script 702 to navigate the messages. The result may be that the service represented by the ordered stack 704 is not completely performed.

In one embodiment, the method 600 accounts for the incomplete executing of the ordered stack 704 by the execution controller 108 removing the added unpopulated action script 702 from the ordered stack 704 in response to the incomplete executing at the second application 112. The execution controller 108 communicates with the first application 104 regarding the incomplete executing and removal of the added action script 702 from the ordered stack 704. The execution controller 108 also optionally is able to map the message encountered at the second application 112 to an appropriate communication with the first application 104. For example, an error message encountered at a particular state 402 of the second application 112 can be mapped to a suitable error message at a corresponding state 402 of the first application 104, and an information message can be mapped in a similar way. Additionally, the execution controller 108 can be programmed to distinguish between error messages and information messages. In the case of some information messages, the execution controller 108 can dynamically insert commands into to the action script 702 to overcome the information messages and promote complete execution of the ordered stack 704.

Figure 10:
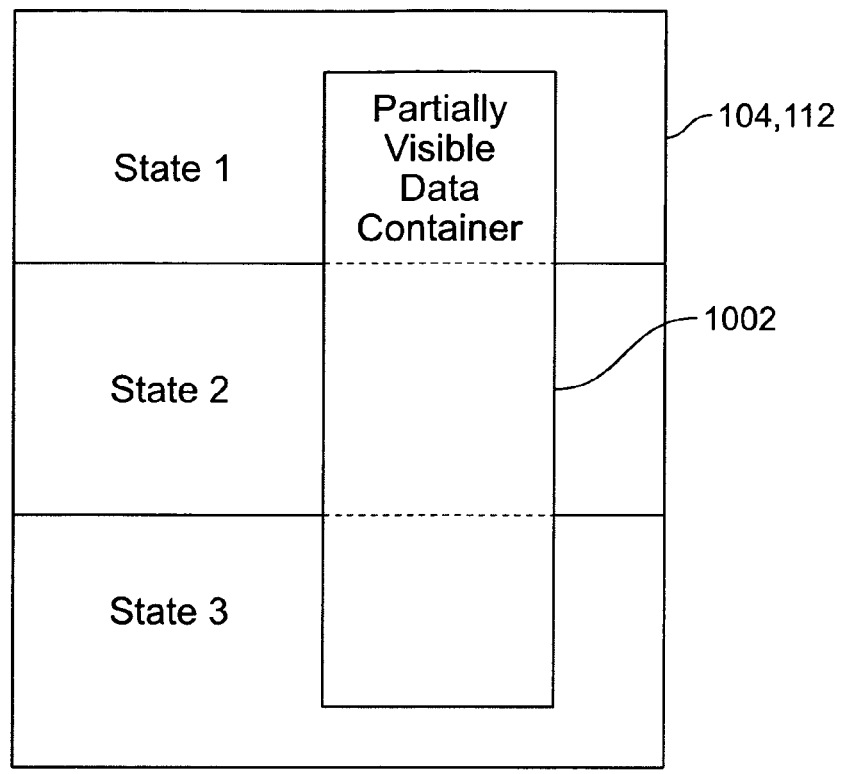
FIG. 10 is a schematic diagram depicting one embodiment of a partially-visible data container.

In one embodiment, a particular second state 402 of the plurality of second states 402 of the second application 112 comprises a data container 1002 having contents which are only partially available, i.e. visible, to the particular second state 402. For example, a particular second state 402 of the second application 112 may comprise a first portion of a table from the database 116, the complete table being completely visible only by visiting a plurality of second states 402 of the second application 112. FIG. 10 is a schematic diagram depicting one embodiment of a partially-visible data container 1002 of either the first application 104 or the second application 112.

In one embodiment of the method 600, the execution controller 108 dynamically inserts browsing commands into the added action script 702 to retrieve the entire partially-visible data container 1002. For example, in one embodiment, a predetermined number of browsing commands are inserted into the added action script 702 by the execution controller 108 to retrieve portions of the data container 1002 not available to a particular second state 402. Because it sometimes cannot be known in advance how large the partially-visible data container 1002 is, in one embodiment each of the predetermined number of browsing commands are evaluated to determine if they have returned new portions of the data container 1002. Evaluation of the results of the browsing commands optionally comprises examining a key of the data container 1002 returned by the browsing commands. For example, if the data container 1002 is a database table, a key of the table has unique value for each row of the table, and as such, the data returned by the browsing commands can be examined to determine if new values of the key are returned. If each of the default number of browsing commands returns new portions of the data container 1002, additional browsing commands are inserted into the added action script 702 by the execution controller 108 and then the entire ordered stack 704 of action scripts 702 is re-executed at the second application 112. This process is repeated until all portions of the partially-visible data container 1002 are retrieved.

In one embodiment, the minimum number of browsing commands required to retrieve the entire contents of the data container 1002 is determined, and this minimum number is stored by the execution controller 108 for future use by the execution controller 108. Thus, a subsequent access of the partially-visible data container 1002 may be more efficient and may require less trial and error determination of the correct number of browsing commands. The storing of the minimum number associates the minimum number with at least one of: an identity of the partially-visible data container 1002, or an identity of the particular second state 402 of the second application 112 having the partially-visible data container 1002. In one embodiment, the predetermined number of browsing commands inserted into the added action script 702 by the execution controller 108 is the most-previously stored minimum number of browsing commands required to retrieve the entire contents of that partially-visible data container 1002.

One benefit of retrieving the entire partially-visible data container 1002 by dynamically inserting browsing commands is that the need for back and forth adding and executing of browsing action scripts 702c (shown in FIG. 11) can be eliminated in the case in which the user of the first application 104 decides to browse a data container in the first application 104 corresponding to the partially-visible data container 1002 of the second application 112. In such a case, the entire data container has already been retrieved and the user can thus browse it in the first application 104 without back and forth adding and executing of browsing action scripts 702c by the fist application 104, execution controller 108 and second application 112.

In one embodiment, browsing commands to retrieve the entire contents of the partially-visible data container 1002 are only dynamically inserted into an action script 702 if that action script 702 is the last action script 702 in the order 710 of the ordered stack 704 of action scripts 702. In such an embodiment, action scripts 702 prior to the last action script 702 in the order 710 of the ordered stack 704 are not altered by the controller 108 to retrieve the entire partially-visible data container 1002. Furthermore, in one embodiment, previously added browsing commands are removed from action scripts 702 other than the last action script 702 in the ordered stack 704. Such browsing commands can be instead replaced with positioning commands if necessary.

The navigation input 706 received at the first application 102 may access a particular portion of a data container of the first state 402a of the fist application 104, for example a particular entry in a large database table, which has a corresponding entry in a corresponding data container accessed by the second application 112. Furthermore, accessing the corresponding portion in the corresponding data container in the second application 112 may require executing one or more browsing commands at the second application 112. In one embodiment, instead of using browsing commands to access the corresponding particular portion in the second application 112, the execution controller 108 inserts a positioning command into the added action script 702 to access the corresponding portion of the corresponding data container in the corresponding second state 402 of the second application 112. Thus, the added action script 702 uses the positioning command to directly address the corresponding portion without using browsing commands to browse to the corresponding portion, which may be more efficient because a single positioning command may replace a plurality of browsing commands in certain scenarios.

Figure 11:
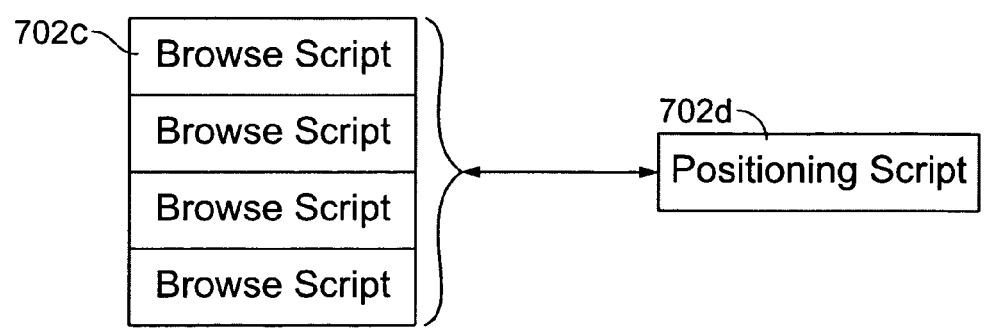
FIG. 11 is a schematic diagram depicting one embodiment of a correspondence between browsing scripts and positioning scripts.

FIG. 11 is a schematic diagram depicting one embodiment of a correspondence between browsing commands and positioning commands. In the depicted embodiment, a plurality of browsing action scripts 702c, each containing at least one browsing command, are equivalent to a single positioning action script 702d, containing one positioning command.

In one embodiment, the navigation input 706 received at the first application 104 comprises selecting a particular portion of a data container of the first state 402a of the fist application 104, and the method 600 comprises inserting a positioning command into the added action script 702 by the controller 108 to position a corresponding data container relative to a corresponding second state 402 of the second application 112 so that a portion of the corresponding data container corresponding to the selected portion of the data container in the first state 402a of the first application 104 is a first available portion of the corresponding data container available to the corresponding second state 402 of the second application 112. Subsequently, any commands directed to the positioned data container in the corresponding second state 402 of the second application 112 may act directly on the first available portion (corresponding to the selected portion) without requiring further browsing commands in the second application 112.

Further embodiments are also possible, which are the result of variously combining steps, elements or embodiments described herein. For example, further embodiments may comprise an altered order of the steps of the methods 300 and 600 described herein, the result of which may be an embodiment particularly suited to a specific purpose or implementation. In another example, embodiments of the methods 300 and 600 may include or exclude optional steps described herein. In yet another example, embodiments of the methods 300 and 600 may be combined to create further embodiments. Additional embodiments, which would be discernable based on the description herein, are also possible.

What is claimed is:

1. A method, comprising:
 in response to a first navigation input received at a first application:
   adding a corresponding action script to an ordered stack of action scripts maintained by an execution controller, wherein the added action script is unpopulated by data input, and the added action script is added last in an order of the ordered stack;

providing the ordered stack of action scripts to a second application by the execution controller; and executing at the second application the ordered stack of action scripts according to the order, the ordered stack having the unpopulated first action script, while maintaining the existence of the ordered stack of action scripts by the execution controller;

receiving a data input at the first application; and populating by the execution controller the added first action script in the maintained ordered stack of action scripts with the data input after the executing, wherein each time a new navigation input is received by the first application:

a corresponding new action script is added to the ordered stack of action scripts maintained by the execution controller, the new action script being unpopulated by data input, a most-previously added action script is populated with any additional corresponding data inputs received at the first application since a previous execution, and the entire ordered stack of action scripts is re-executed at the second application.

2. The method of claim 1, wherein the first navigation input navigates between first and second states of the first application, and the receiving the data input includes receiving data input to the second state.

3. The method of claim 1, wherein the first application comprises a user interface that is accessed in real-time by a human user, the second application comprises a batch input functionality that processes batches of commands without requiring real-time access by a human user for each command, and the execution controller is capable of communicating with both the first application and the second application.

4. The method of claim 1, wherein the populating is triggered by at least one of:

receiving the data input at the first application, or receiving a second navigation input at the first application.

5. The method of claim 1, further comprising:

removing the added unpopulated action script from the ordered stack of action scripts in response to the ordered stack of action scripts not completely executing at the second application, wherein the incomplete executing of the ordered stack of action scripts is due to a message being generated by the second application which stops the executing, the generated message requiring a responsive input for the executing to continue, the generated message comprising at least one of: an error message, or an information message.

6. The method of claim 1, wherein the navigation input comprises accessing a particular portion of a data container of the first state of the fist application, the method further comprising:

inserting a positioning command into the added action script by the controller to access a corresponding portion of a corresponding data container in a second state of the second application, wherein the added action script uses the positioning command to directly address the corresponding portion and does not use browsing commands to browse to the corresponding portion.

7. The method of claim 1, wherein the navigation input comprises selecting a particular portion of a data container of the first state of the fist application, the method further comprising:

inserting a positioning command into the added action script by the controller to position a second state of the second application relative to the corresponding data container so that a corresponding portion of the corresponding data container is a topmost portion of the corresponding data container available to the positioned second state of the second application.

8. A method, comprising:

adding an action script to an ordered stack of action scripts maintained by an execution controller, wherein the added action script corresponds to a navigation input received at a first application, the added action script is unpopulated by any data input, and the added action script is added last in an order of the ordered stack;

providing the ordered stack of action scripts to a second application by the execution controller;

executing at the second application the ordered stack of action scripts according to the order, the ordered stack having the unpopulated first action script, while maintaining the existence of the ordered stack of action scripts;

receiving a data input at the first application;

populating the added first action script in the ordered stack of action scripts with the data input after the executing; and receiving the navigation input at the first application, wherein the navigation input navigates between first and second states of the first application, wherein the receiving the data input includes receiving data input to the second state, wherein the first state of the first application comprises elements corresponding to at least one first state of the second application, and the second state of the first application comprises elements corresponding to a plurality of second states of the second application, and wherein the executing of the added action script at the second application comprises navigating from the at least one first state of the second application through all of the plurality of second states of the second application.

9. The method of claim 8, wherein at most one of the plurality of second states of the second application requires data input, the at most one second state requiring data input being last in a sequence of the navigating through all of the plurality of second states of the second application.

10. The method of claim 8, wherein a particular second state of the plurality of second states of the second application comprises a data container having contents which are only partially available to the particular second state, the method further comprising:

inserting a predetermined number of browsing commands into the added action script by the controller to retrieve portions of the data container not available to the particular second state;

evaluating if each of the default number of browsing commands returned new portions of the data container by examining a key of the data container;

if each of the default number of browsing commands returned new portions of the data container, inserting additional browsing commands into added action script by the controller and then re-executing the entire ordered stack of action scripts at the second application;

determining the minimum number of browsing commands required to retrieve the entire contents of the data container; and storing, by the controller, the minimum number of browsing commands required to retrieve the entire contents of the data container, wherein the storing associates the minimum number with an identity of the data container and an identity of the particular second state of the second application.

11. A method, comprising:
adding an action script to an ordered stack of action scripts maintained by an execution controller, wherein the added action script corresponds to a navigation input received at a first application, the added action script is unpopulated by any data input, and the added action script is added last in an order of the ordered stack;
providing the ordered stack of action scripts to a second application by the execution controller;
executing at the second application the ordered stack of action scripts according to the order, the ordered stack having the unpopulated first action script, while maintaining the existence of the ordered stack of action scripts;
receiving a data input at the first application; and
populating the added first action script in the ordered stack of action scripts with the data input after the executing,
wherein the ordered stack of action scripts comprises a plurality of action scripts, and the executing of the ordered stack of action scripts comprises:
launching the second application at the beginning of the executing of the ordered stack of action scripts;
executing all of the plurality of action scripts; and
terminating the second application upon completion of the executing of the ordered stack of action scripts.

12. A computer-readable storage medium comprising program instructions, which when executed by a processor perform a method, the method comprising:
in response to a first navigation input received at a first application:
adding a corresponding action script to an ordered stack of action scripts maintained by an execution controller, wherein the added action script is unpopulated by data input, and the added action script is added last in an order of the ordered stack;
providing the ordered stack of action scripts to a second application by the execution controller; and
executing at the second application the ordered stack of action scripts according to the order, the ordered stack having the unpopulated first action script, while maintaining the existence of the ordered stack of action scripts by the execution controller;
receiving a data input at the first application; and
populating by the execution controller the added first action script in the maintained ordered stack of action scripts with the data input after the executing,
wherein each time a new navigation input is received by the first application:
a corresponding new action script is added to the ordered stack of action scripts maintained by the execution controller, the new action script being unpopulated by data input,
a most-previously added action script is populated with any additional corresponding data inputs received at the first application since a previous execution, and
the entire ordered stack of action scripts is re-executed at the second application.

13. The computer-readable storage medium of claim 12, wherein the first navigation input navigates between first and second states of the first application, and the receiving the data input includes receiving data input to the second state.

14. The computer-readable storage medium of claim 12, wherein the first application comprises a user interface that is accessed in real-time by a human user, the second application comprises a batch input functionality that processes batches of commands without requiring real-time access by a human user for each command, and the execution controller is capable of communicating with both the first application and the second application.

15. The computer-readable storage medium of claim 12, the method further comprising:
removing the added unpopulated action script from the ordered stack of action scripts in response to the ordered stack of action scripts not completely executing at the second application,
wherein the incomplete executing of the ordered stack of action scripts is due to a message being generated by the second application which stops the executing, the generated message requiring a responsive input for the executing to continue, the generated message comprising at least one of: an error message, or an information message.

16. A computer-readable storage medium comprising program instructions, which when executed by a processor perform a method, the method comprising:
adding an action script to an ordered stack of action scripts maintained by an execution controller, wherein the added action script corresponds to a navigation input received at a first application, the added action script is unpopulated by any data input, and the added action script is added last in an order of the ordered stack;
providing the ordered stack of action scripts to a second application by the execution controller;
executing at the second application the ordered stack of action scripts according to the order, the ordered stack having the unpopulated first action script, while maintaining the existence of the ordered stack of action scripts;
receiving a data input at the first application;
populating the added first action script in the ordered stack of action scripts with the data input after the executing; and
receiving the navigation input at the first application, wherein the navigation input navigates between first and second states of the first application,
wherein the receiving the data input includes receiving data input to the second state,
wherein the first state of the first application comprises elements corresponding to at least one first state of the second application, and the second state of the first application comprises elements corresponding to a plurality of second states of the second application, and
wherein the executing of the added action script at the second application comprises navigating from the at least one first state of the second application through all of the plurality of second states of the second application.

17. The computer-readable storage medium of claim 16, wherein a particular second state of the plurality of second states of the second application comprises a data container having contents which are only partially available to the particular second state, the method further comprising:
inserting a predetermined number of browsing commands into the added action script by the controller to retrieve portions of the data container not available to the particular second state;
evaluating if each of the default number of browsing commands returned new portions of the data container by examining a key of the data container;
if each of the default number of browsing commands returned new portions of the data container, inserting additional browsing commands into added action script by the controller and then re-executing the entire ordered stack of action scripts at the second application;

determining the minimum number of browsing commands required to retrieve the entire contents of the data container; and storing, by the controller, the minimum number of browsing commands required to retrieve the entire contents of the data container, wherein the storing associates the minimum number with an identity of the data container and an identity of the particular second state of the second application.

18. A computer-readable storage medium comprising program instructions, which when executed by a processor perform a method, the method comprising:

adding an action script to an ordered stack of action scripts maintained by an execution controller, wherein the added action script corresponds to a navigation input received at a first application, the added action script is unpopulated by any data input, and the added action script is added last in an order of the ordered stack;

providing the ordered stack of action scripts to a second application by the execution controller;

executing at the second application the ordered stack of action scripts according to the order, the ordered stack having the unpopulated first action script, while maintaining the existence of the ordered stack of action scripts;

receiving a data input at the first application; and populating the added first action script in the ordered stack of action scripts with the data input after the executing;

wherein the ordered stack of action scripts comprises a plurality of action scripts, and the executing of the ordered stack of action scripts comprises:

launching the second application at the beginning of the executing of the ordered stack of action scripts;

executing all of the plurality of action scripts; and terminating the second application upon completion of the executing of the ordered stack of action scripts.

19. A system, comprising:

means for adding, in response to a first navigation input received at a first application, a corresponding action script to an ordered stack of action scripts maintained by an execution controller, wherein the added action script is unpopulated by data input, and the added action script is added last in an order of the ordered stack;

means for providing the ordered stack of action scripts to a second application by the execution controller;

means for executing at the second application the ordered stack of action scripts according to the order, the ordered stack having the unpopulated first action script, while maintaining the existence of the ordered stack of action scripts by the execution controller;

means for receiving a data input at the first application;

means for populating by the execution controller the added first action script in the maintained ordered stack of action scripts with the data input after the executing; and means for, each time a new navigation input is received by the first application:

adding a corresponding new action script to the ordered stack of action scripts maintained by the execution controller, the new action script being unpopulated by data input, populating a most-previously added action script with any additional corresponding data inputs received at the first application since a previous execution, and re-executing the entire ordered stack of action scripts at the second application.

20. The system of claim 19, wherein the first navigation input navigates between first and second states of the first application, and the receiving the data input includes receiving data input to the second state.

21. The system of claim 19, wherein the first application comprises a user interface means for accessing the first application in real-time by a human user, the second application means comprises a batch input means for processing batches of commands without requiring real-time access by a human user for each command, and the execution controller is capable of communicating with both the first application and the second application.

22. The system of claim 19, wherein the means for populating is triggered by at least one of: receiving the data input at the first application, or receiving a second navigation input at the first application.

23. The system of claim 19, further comprising:

means for removing the added unpopulated action script from the ordered stack of action scripts in response to the ordered stack of action scripts not completely executing at the second application, wherein the incomplete executing of the ordered stack of action scripts is due to a message being generated by the second application which stops the executing, the generated message required a responsive input for the executing to continue, the generated message comprising at least one of: an error message, or an information message.

24. The system of claim 19, wherein the navigation input comprises accessing a particular portion of a data container of the first state of the fist application, the system further comprising:

means for inserting a positioning command into the added action script by the execution controller to access a corresponding portion of a corresponding data container in a second state of the second application, wherein the added action script uses the positioning command to directly address the corresponding portion and does not use browsing commands to browse to the corresponding portion.

25. The system of claim 19, wherein the navigation input comprises selecting a particular portion of a data container of the first state of the fist application, the system further comprising:

means for inserting a positioning command into the added action script by the execution controller to position a second state of the second application relative to the corresponding data container so that a corresponding portion of the corresponding data container is a topmost portion of the corresponding data container available to the positioned second state of the second application.

26. A system, comprising:

means for adding an action script to an ordered stack of action scripts maintained by an execution controller, wherein the added action script corresponds to a navigation input received at a first application, the added action script is unpopulated by any data input, and the added action script is added last in an order of the ordered stack;

means for providing the ordered stack of action scripts to a second application by the execution controller;

means for executing at the second application the ordered stack of action scripts according to the order, the ordered stack having the unpopulated first action script, while maintaining the existence of the ordered stack of action scripts;

means for receiving a data input at the first application;

means for populating the added first action script in the ordered stack of action scripts with the data input after the executing, and means for receiving the navigation input at the first application, wherein the navigation input navigates between first and second states of the first application, wherein the receiving the data input includes receiving data input to the second state, wherein the first state of the first application comprises elements corresponding to at least one first state of the second application, and the second state of the first application comprises elements corresponding to a plurality of second states of the second application; and wherein the means executing of the added action script at the second application comprises means for navigating from the at least one first state of the second application through all of the plurality of second states of the second application.

27. The system of claim 26, wherein at most one of the plurality of second states of the second application requires data input, the at most one second state requiring data input being last in a sequence of the navigating through all of the plurality of second states of the second application.

28. The system of claim 26, wherein a particular second state of the plurality of second states of the second application comprises a data container having contents which are only partially available to the particular second state, the system further comprising:

means for inserting a predetermined number of browsing commands into the added action script by the controller to retrieve portions of the data container not available to the particular second state;

means for evaluating if each of the default number of browsing commands returned new portions of the data container by examining a key of the data container;

means for inserting, if each of the default number of browsing commands returned new portions of the data container, additional browsing commands into the added action script by the execution controller and then re-executing the entire ordered stack of action scripts at the second application;

means for determining the minimum number of browsing commands required to retrieve the entire contents of the data container; and means for storing, by the execution controller, the minimum number of browsing commands required to retrieve the entire contents of the data container, wherein the means for storing associates the minimum number with an identity of the data container and an identity of the particular second state of the second application.

29. A system, comprising:

means for adding an action script to an ordered stack of action scripts maintained by an execution controller, wherein the added action script corresponds to a navigation input received at a first application, the added action script is unpopulated by any data input, and the added action script is added last in an order of the ordered stack;

means for providing the ordered stack of action scripts to a second application by the execution controller;

means for executing at the second application the ordered stack of action scripts according to the order, the ordered stack having the unpopulated first action script, while maintaining the existence of the ordered stack of action scripts;

means for receiving a data input at the first application; and means for populating the added first action script in the ordered stack of action scripts with the data input after the executing, wherein the ordered stack of action scripts comprises a plurality of action scripts, and the means for executing the ordered stack of action scripts comprises:

means for launching the second application at the beginning of the executing of the ordered stack of action scripts;

means for executing all of the plurality of action scripts; and means for terminating the second application upon completion of the executing of the ordered stack of action scripts.

* * * * *

UNITED STATES PATENT AND TRADEMARK OFFICE
CERTIFICATE OF CORRECTION

PATENT NO.      : 7,661,113 B2                                    Page 1 of 1
APPLICATION NO. : 11/606441
DATED           : February 9, 2010
INVENTOR(S)     : Böckenhauer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 677 days.

Signed and Sealed this

Thirtieth Day of November, 2010

David J. Kappos
*Director of the United States Patent and Trademark Office*